US010034036B2

(12) United States Patent
Subramanya et al.

(10) Patent No.: US 10,034,036 B2
(45) Date of Patent: Jul. 24, 2018

(54) MEDIA SYNCHRONIZATION FOR REAL-TIME STREAMING

(71) Applicant: Microsoft Technology Licensing, LLC, Redmond, WA (US)

(72) Inventors: Karthik Nallapeta Subramanya, Redmond, WA (US); Michael Lacher, Redmond, WA (US); Quinn Damerell, Redmond, WA (US); Ivan Mladenov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 14/880,178

(22) Filed: Oct. 9, 2015

(65) Prior Publication Data
US 2017/0105038 A1 Apr. 13, 2017

(51) Int. Cl.
*H04N 21/439* (2011.01)
*H04N 21/43* (2011.01)
(Continued)

(52) U.S. Cl.
CPC ......... *H04N 21/4307* (2013.01); *G11B 27/36* (2013.01); *H04N 5/04* (2013.01); *H04N 21/439* (2013.01); *H04N 21/8456* (2013.01)

(58) Field of Classification Search
None
See application file for complete search history.

(56) References Cited

U.S. PATENT DOCUMENTS 5,202,761 A * 4/1993 Cooper ............... H04N 5/04
348/515
5,570,372 A * 10/1996 Shaffer .............. H04N 21/2368
348/515
(Continued)

FOREIGN PATENT DOCUMENTS

WO 2014161990 A1 10/2014

OTHER PUBLICATIONS

"NVIDIA Demonstrates Streaming 3D Video Using Microsoft Silverlight", Retrieved at: <<http://www.nvidia.com/object/io_1275286847414.html>>, May 31, 2010, 3 pages.
(Continued)

*Primary Examiner* — Scott B Christensen
(74) *Attorney, Agent, or Firm* — Arent Fox LLP

(57) ABSTRACT

In one example, a client device interacting with a streaming application server may synchronize an audio stream to a corresponding video stream. The client streaming device may have an audio channel to receive a current audio packet of an audio stream from a streaming application server. The client streaming device may have a video channel to receive a current video packet of a video stream from the streaming application server. The client streaming device may execute a media synchronization module to synchronize the audio stream to the video stream by measuring a video display time change for the video stream describing a video delay between generating video data at the streaming application server and displaying the video data at the streaming client device to a user. The client streaming device may execute an audio adjustment module to adjust an audio presentation time for the audio stream indicating when a subsequent audio packet is played to the user based on the video display time change.

20 Claims, 9 Drawing Sheets

(51) Int. Cl.
*H04N 5/04* (2006.01)
*G11B 27/36* (2006.01)
*H04N 21/845* (2011.01)

(56) References Cited

U.S. PATENT DOCUMENTS

| | | | |
|---|---|---|---|
| 5,596,364 A * | 1/1997 | Wolf | H04N 5/04 |
| | | | 348/180 |
| 5,764,965 A * | 6/1998 | Poimboeuf | G06F 3/14 |
| | | | 348/515 |
| 5,844,600 A * | 12/1998 | Kerr | H04N 7/147 |
| | | | 348/14.09 |
| 7,088,774 B1 | 8/2006 | Moni et al. | |
| 7,471,337 B2 | 12/2008 | Wells et al. | |
| 8,027,560 B2 | 9/2011 | Brady, Jr. et al. | |
| 8,117,039 B2 | 2/2012 | Wang et al. | |
| 8,379,735 B2 | 2/2013 | Lee et al. | |
| 8,558,953 B2 | 10/2013 | Black | |
| 2004/0098633 A1 | 5/2004 | Lienhart et al. | |
| 2005/0276282 A1* | 12/2005 | Wells | H04N 7/56 |
| | | | 370/503 |
| 2009/0118017 A1* | 5/2009 | Perlman | A63F 13/355 |
| | | | 463/42 |
| 2010/0201824 A1* | 8/2010 | Wei | H04N 21/42646 |
| | | | 348/180 |
| 2013/0141643 A1 | 6/2013 | Carson et al. | |
| 2013/0336412 A1 | 12/2013 | Erofeev et al. | |
| 2015/0062429 A1 | 3/2015 | Barbulescu et al. | |

OTHER PUBLICATIONS

"Gamers Embrace Live Broadcasting on Playstation®4 (PS4™)", Retrieved at: <<http://www.sony.com/en_us/SCA/company-news/press-releases/sony-computer-entertainment-america-inc/2013/gamers-embrace-live-broadcasting-on-playstation4-p.html>>, Dec. 10, 2013, 2 pages.

* cited by examiner

400

500

700

MEDIA SYNCHRONIZATION FOR REAL-TIME STREAMING

BACKGROUND

A user device may connect to a streaming application server to interact with a network service, such as a multiple user online game, a single player streaming game, a remote device controller, or any other application using interactive audio and video data. The streaming application server may generate content based on a user input. The user may provide an input to a client device, which may then be forwarded to the streaming application server across a data network. For example, a user streaming a game may press a button on a client input device to make an avatar in the game jump. The client device may forward the user input to a gaming application executing on a streaming application server.

The streaming application server may then send video content and audio content back across the data network for presentation to the user. The client device may present the video content and the audio content to the user. In the above example, the client device may present audio content and video content of the avatar jumping. The interactive nature of the video content and the audio content may not allow for much delay between the process of receiving the video content and the audio content and the presentation of the video content and the audio content to the user.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to synchronizing an audio stream to a corresponding video stream. The client streaming device may have an audio channel to receive a current audio packet of an audio stream from a streaming application server. The client streaming device may have a video channel to receive a current video packet of a video stream from the streaming application server. The client streaming device may execute a media synchronization module to synchronize the audio stream to the video stream by measuring a video display time change for the video stream describing a video delay between generating video data at the streaming application server and displaying the video data at the streaming client device to a user. The client streaming device may execute an audio adjustment module to adjust an audio presentation time for the audio stream indicating when a subsequent audio packet is played to the user based on the video display time change.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a streaming client device, a computing device, or a machine-implemented method.

In one example, a client device interacting with a streaming application server may synchronize an audio stream to a corresponding video stream. The client streaming device may have an audio channel to receive a current audio packet of an audio stream from a streaming application server. The client streaming device may have a video channel to receive a current video packet of a video stream from the streaming application server. The client streaming device may execute a media synchronization module to synchronize the audio stream to the video stream by measuring a video display time change for the video stream describing a video delay between generating video data at the streaming application server and displaying the video data at the streaming client device to a user. The client streaming device may execute an audio adjustment module to adjust an audio presentation time for the audio stream indicating when a subsequent audio packet is played to the user based on the video display time change.

In an interactive streaming application, the user may enter an input into a client device, which may be sent to the streaming application server. The streaming application server may use the input data to generate audio content and video content to be provided to the user. The streaming application server may send the audio content and video content to the client device for presentation to the user.

The streaming application server may send the video data and the audio data in separate streams. As the packets of audio data and the packets of video data are of different sizes and different types, the network may transmit the audio packets on a different path from the video packets. Even packets using the same path may arrive at the client device at different times. The streaming application server may bundle the audio packets and video packets into containers, but this bundling may cause a time delay antithetical to the real-time nature of the streaming application. In a communication application, such as a video chat, the audio stream may be considered paramount as containing the major communication data. Thus the client device may synchronize the video stream to the audio stream. In a streaming application such as gaming, video delays may be more noticeable than any delays in the audio. Thus, by synchronizing the audio stream to the video stream, the client device may improve the user experience with the streaming application.

Figure 1:
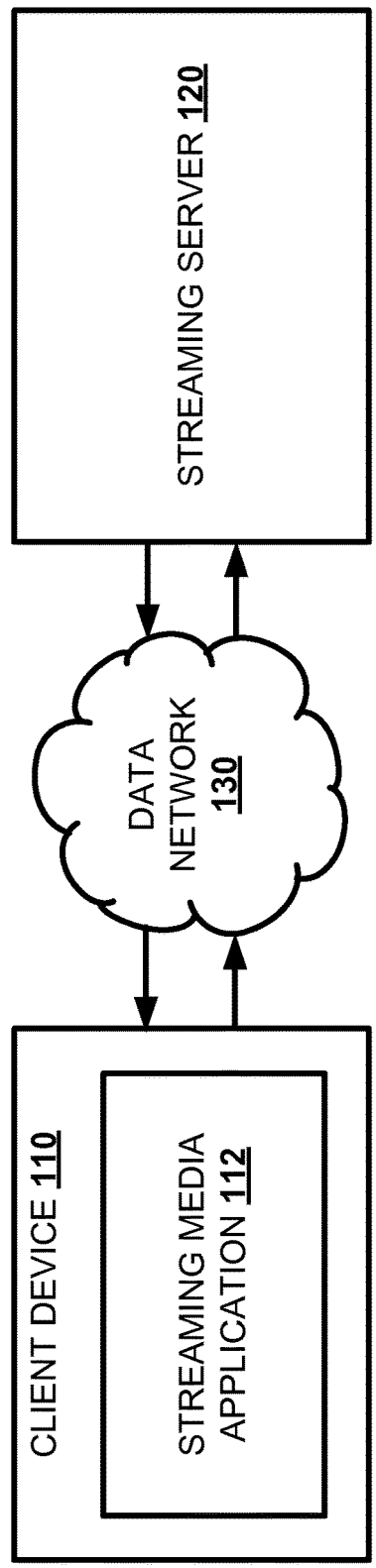
FIG. 1 illustrates, in a block diagram, one example of a streaming network.

A media synchronization module may coordinate synchronization between the audio pipeline and the video pipeline. The media synchronization module may measure the change in time between a streaming application server generating a video packet of a video stream for display to a user and a streaming client device actually displaying the rendered video packet to the user. The media synchronization module may use the video display time change to generate a synchronization metric describing the difference in delays between an audio stream and the video stream to send to an audio adjustment module in an audio pipeline. The audio adjustment module may compare the synchronization metric to a set of metric thresholds to determine an adjustment to an audio stream to synchronize the audio stream to the video stream. The metric threshold set may be a delay threshold indicating to insert a silent audio packet, a lengthening threshold indicating to resample an audio packet to lengthen the audio packet, a compression threshold indicating to resample an audio packet to compress the audio packet, a drop threshold indicating to drop an audio packet, or a different metric threshold indicating a different adjustment is to be made to the audio stream. The media synchronization module may execute a feedback review determining the efficacy of the synchronization by comparing a client display time for the video packet indicating when the video packet was displayed to a user and a client playback time indicating when the audio packet was played to the user. The media synchronization module may adjust one or more metric thresholds of the metric threshold set based on the feedback review FIG. 1 illustrates, in a block diagram, one example of a streaming network 100. A user may use a streaming client device 110 to access a streaming application server 120, such as a multi-user interactive gaming service, via a data network connection 130. The streaming client device 110 may be a personal computer, a laptop, a tablet, a mobile phone, a game console, a smart watch, or other computing device used by the user to access the streaming application server. The streaming application server 120 may be implemented on a single server or a distributed set of servers, such as a server farm. The data network connection 130 may be an internet connection, a wide area network connection, a local area network connection, or other type of data network connection. The streaming client device 110 may use a general use application or a dedicated streaming media application 112, such as an interactive media player or gaming application, to access the streaming application server 120.

The streaming media application 112 may implement an input capture digitizer that creates a data representation of an input provided by the user via an input device. The streaming media application 112 may implement an input processing and transmission module to process the input data and to convert the input data into a format for transmission across the data network 130. The streaming client device 110 may then transmit the input data across the data network 130 to the streaming application server 120.

The streaming application server 120 may receive the input data transmission in an input processing module to convert the input data into a format for processing by an application processing module, such as a game processing module. The application processing module may use the input data to generate media data, having audio and video data, for presentation to the user on the client device 110. For example, a game controller receiving a jump instruction from the user may forward that jump instruction to a streaming gaming server. The streaming gaming server may generate a video with audio of an avatar of a user jumping, which is forwarded to the game controller for presentation to the user. The streaming application server 120 may implement an encoding module that encodes the media data for transmission as a video stream and an audio stream. The streaming application server 120 may implement a packetization and transmission module to format the audio stream into audio packets and the video stream into video packets for separate transmission across the data network 130 to the client device 110.

The client device 110 may receive the audio streams and the video streams in the streaming media application 112. The streaming media application 112 may render the video stream to produce video to display to the user. The streaming media application 112 may measure the video display time change for the video stream based on the difference between when the video was generated at the streaming application server 120 and when the video stream was presented to the user. The streaming media application 112 may then use the video display time change to adjust the playing time of the audio stream so that the audio stream is synchronized to the video stream. The streaming media application 112 may render the audio stream. The streaming application 112 may then play the audio stream synchronized to the video stream.

Figure 2:
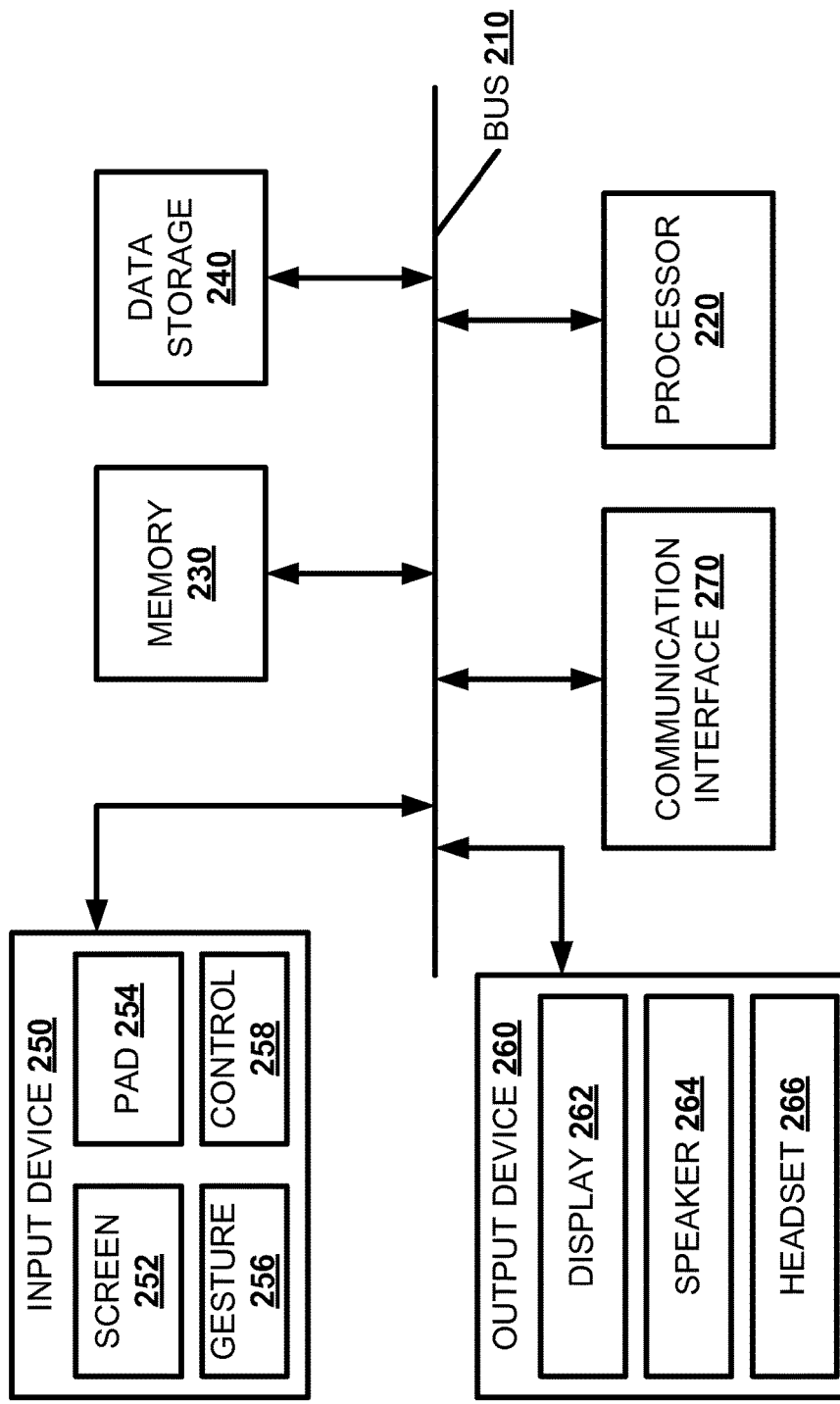
FIG. 2 illustrates, in a block diagram, one example of a computing device.

FIG. 2 illustrates a block diagram of an exemplary computing device 200 which may act as a streaming client device or a streaming application server. The computing device 200 may combine one or more of hardware, software, firmware, and system-on-a-chip technology to implement a streaming client device or a streaming application server. The computing device 200 may include a bus 210, a processing core 220, a memory 230, a data storage 240, an input device 250, an output device 260, and a communication interface 270. The bus 210, or other component interconnection, may permit communication among the components of the computing device 200.

The processing core 220 may include at least one conventional processor or microprocessor that interprets and executes a set of instructions. The processing core may execute a media synchronization module to synchronize the audio stream to the video stream. The media synchronization module may synchronize the audio stream to the video stream by measuring a video display time change for the video stream describing a video delay between generating video data at the streaming application server and displaying the video data at the streaming client device to a user. The media synchronization module may subtract a server video record time indicating when the current video packet was generated at the streaming application server from a client display time for the current video packet indicating when the current video packet was displayed to the user to determine the video display time change. The media synchronization module may measure an audio playback time change for the audio stream describing an audio delay between generating audio data at the streaming application server and playing the audio data at the streaming client device to a user. The media synchronization module may subtract a server audio record time indicating when the current audio packet was generated at the streaming application server from a client playback time for the current audio packet indicating when the current audio packet was played to the user to determine the audio playback time change. The media synchronization module may calculate a synchronization metric describing a delay difference between the video stream and the audio stream based on a difference between the video display time change and an audio playback time change. The media synchronization module may execute a synchronization feedback review. The synchronization feedback review may compare the client display time for the current video packet to the client playback time for the current audio packet to judge the synchronization between the video stream and the audio stream. The media synchronization module may adjust a metric threshold set, such as a delay threshold, a lengthening threshold, a compression threshold, or a drop threshold, describing at least one adjustment benchmark based on the synchronization feedback review.

The processing core 220 may execute an audio adjustment module to adjust an audio presentation time for the audio stream indicating when a subsequent audio packet is played to the user based on a synchronization metric incorporating the video display time change. The audio adjustment module may insert a silent audio packet into the audio stream when a synchronization metric is above a delay threshold. The audio adjustment module may lengthen the current audio packet when a synchronization metric is above a lengthening threshold. The audio adjustment module may compress the current audio packet when a synchronization metric is below a compression threshold. The audio adjustment module may drop the current audio packet when a synchronization metric is below a drop threshold.

The memory 230 may be a random access memory (RAM) or another type of dynamic data storage that stores information and instructions for execution by the processor 220. The memory 230 may also store temporary variables or other intermediate information used during execution of instructions by the processor 220. The memory 230 may be configured to record a client display time for the current video packet indicating when the current video packet was displayed to the user. The memory 230 may be configured to record a client playback time for the current audio packet indicating when the current audio packet was played to the user. The memory 230 may store a video display time change for a video stream describing a video delay between generating video data at a streaming application server and displaying the video data at the computing device to a user. The memory 230 may store an audio playback time change for an audio stream describing an audio delay between generating audio data at the streaming application server and playing the audio data at the computing device to the user.

The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing a video stream or an audio stream.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, a game controller 258, etc. The input device 250 may be configured to receive a user feedback to indicate that the audio stream and the video stream are misaligned. The media synchronization module may respond by adjusting the metric threshold set. The output device 260 may include one or more conventional mechanisms that output information to the user, including a display screen 262, a printer, one or more speakers 264, a headset 266, a vibrator, or a medium, such as a memory, or a magnetic or optical disk and a corresponding disk drive. A speaker 264 may be configured to play the audio stream. A display 262 may be configured to display the video stream.

The communication interface 270 may include any transceiver-like mechanism that enables computing device 200 to communicate with other devices or networks. The communication interface 270 may include a network interface or a transceiver interface. The communication interface 270 may be a wireless, wired, or optical interface. The communication interface 270 may be configured to have an audio channel to receive a current audio packet of an audio stream from a streaming application server. The audio channel may be configured to receive a server audio record time with the current audio packet indicating when the current audio packet was generated at the streaming application server. The communication interface 270 may be configured to have a video channel to receive a current video packet of a video stream from the streaming application server. The video channel may be configured to receive a server video record time with the current video packet indicating when the current video packet was generated at the streaming application server.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
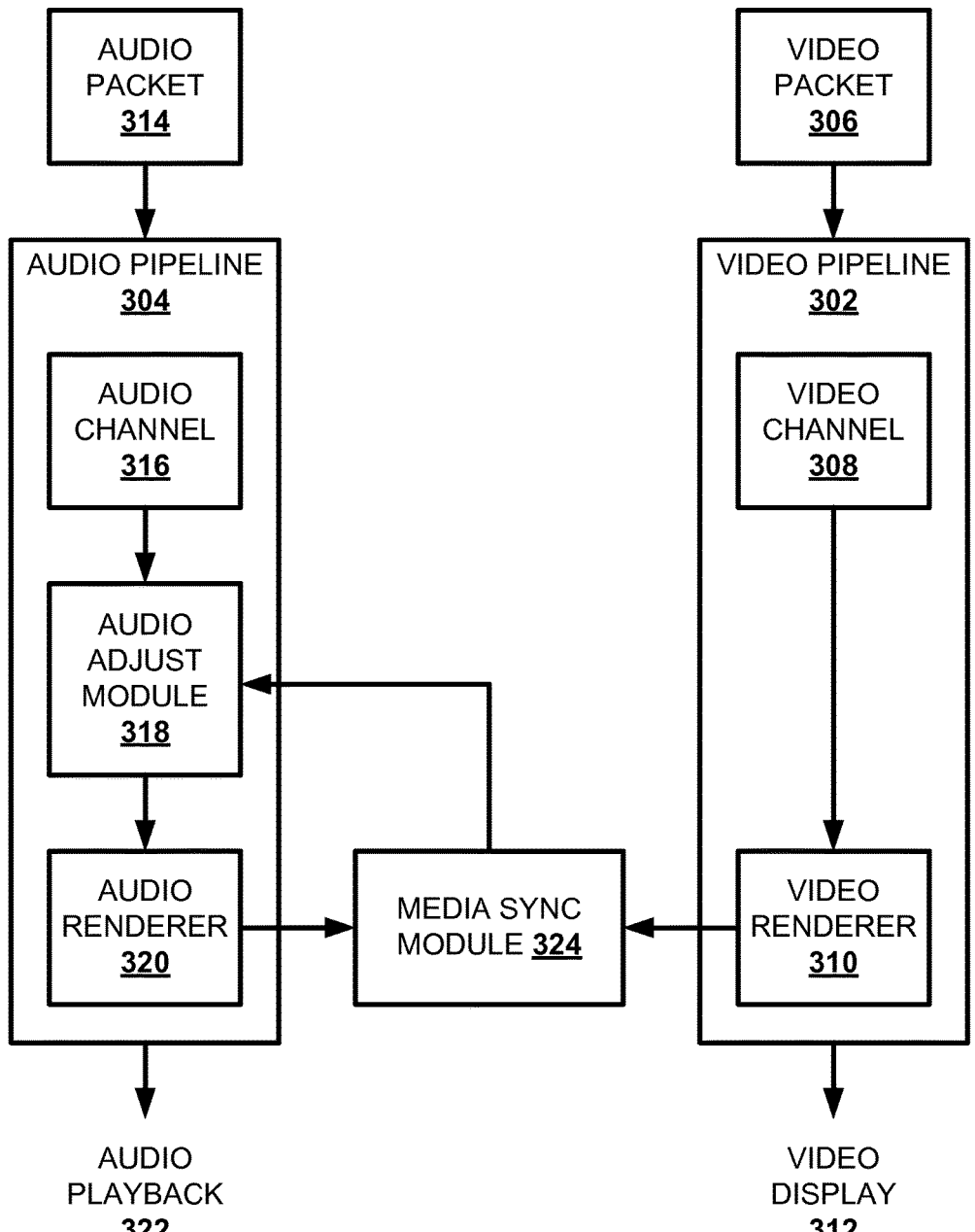
FIG. 3 illustrates, in a block diagram, one example of a streaming media application architecture.

FIG. 3 illustrates, in a block diagram, one example of a streaming media application architecture 300. The streaming client device may receive a video stream in a video pipeline 302 and an audio stream in an audio pipeline 304. The video pipeline 304 may receive a video packet 306 of the video stream via the communication interface of the streaming client device in a video channel 308. Each video packet 306 of the video stream may have a server video record time indicating when the associated video packet 306 was generated at the streaming application server. The video channel 308 may pass the video packet 306 to a video renderer 310 to generate a video frame for presentation to the user via a video display device 312, such as a display or glasses. The video renderer 310 may record when the video frame is rendered by the video display device 312 for display to the user as a client display time.

The audio pipeline 304 may receive an audio packet 314 of the audio stream via the communication interface of the streaming client device in an audio channel 316. Each audio packet 314 of the audio stream may have a server audio record time indicating when the associated audio packet 314 was generated at the streaming application server. The audio channel 316 may pass the audio packet 314 to an audio adjustment module 318 to adjust an audio presentation time for the audio packet 314 based on a video display time change. The audio adjustment module 318 may pass the time-adjusted audio packet 314 to an audio renderer 320 to generate audio for presentation to the user via an audio playback device 322, such as a speaker or a headset 70. The audio renderer 320 may record when the audio is rendered by the audio playback device 322 for presentation to the user as a client playback time.

The audio adjustment module 318 may receive a synchronization metric based on the video display time change from a media synchronization module 324. The media synchronization module 324 may coordinate synchronization between the audio pipeline 304 and the video pipeline 302. The media synchronization module 324 may use the server video record time and the server audio record time to match a video packet 306 to an audio packet 314. The video renderer 310 may send the server video record time and the client display time to the media synchronization module 324 as part of a video timing report. The video renderer 310 may calculate a video display time change by subtracting a server video record time from a client display time to send to the media synchronization module 324. Alternately, the synchronization module 324 may calculate the video display time change by subtracting the server video record time from a client display time.

The audio renderer 320 may send the server audio record time and the client playback time to the media synchronization module 324 as part of an audio timing report. The audio renderer 310 may calculate an audio playback time change by subtracting a server audio record time from a client playback time to send the media synchronization module 324. Alternately, the media synchronization module 324 may calculate the audio playback time change by subtracting the server audio record time from the client playback time. The media synchronization module 324 may use the audio playback time change as a check against the video display time change. Alternately, the media synchronization module 324 may use the video display time change and the audio playback time change to calculate an adjusted synchronization metric. The media synchronization module 324 may adjust the synchronization metric for any delays affecting both the video stream and the audio stream.

Figure 4:
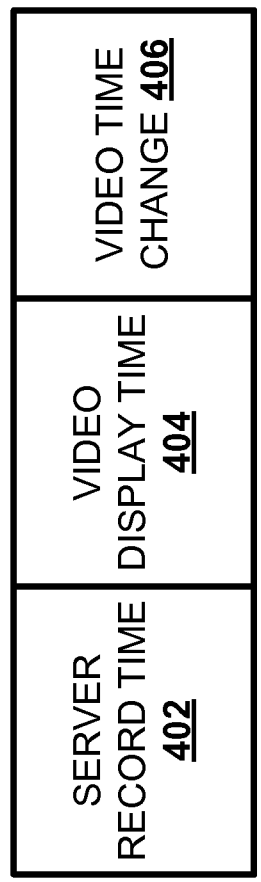
FIG. 4 illustrates, in a block diagram, one example of a video timing report.

FIG. 4 illustrates, in a block diagram, one example of a video timing report 400. The video timing report 400 may have a server video record time 402 indicating when a video packet was generated at the server. The video timing report 400 may use the server video record time 402 to act as an identifier for the video packet. Alternately, the video timing report 400 may have a separate video packet identifier to identify the video packet described in the video timing report 400. The video timing report 400 may have a video display time 404 indicating when the video frames described in the video packet is displayed to the user by the display of the streaming client device. The video timing report 400 may have a video display time change 406 indicating the delay between the server video record time 402 and the video display time 404.

Figure 5:
FIG. 5 illustrates, in a block diagram, one example of an audio timing report.

FIG. 5 illustrates, in a block diagram, one example of an audio timing report 500. The audio timing report 500 may have a server audio record time 502 indicating when an audio packet was generated at the server. The audio timing report 500 may use the server audio record time 502 to act as an identifier for the video packet. Alternately, the audio timing report 500 may have a separate audio packet identifier to identify the audio packet described in the audio timing report 500. The audio timing report 500 may have an audio playback time 504 indicating when the audio described in the audio packet is played to the user by the speaker of the streaming client device. The audio timing report 500 may have an audio playback time change 506 indicating the delay between the server audio record time 502 and the audio playback time 504.

Figure 6:
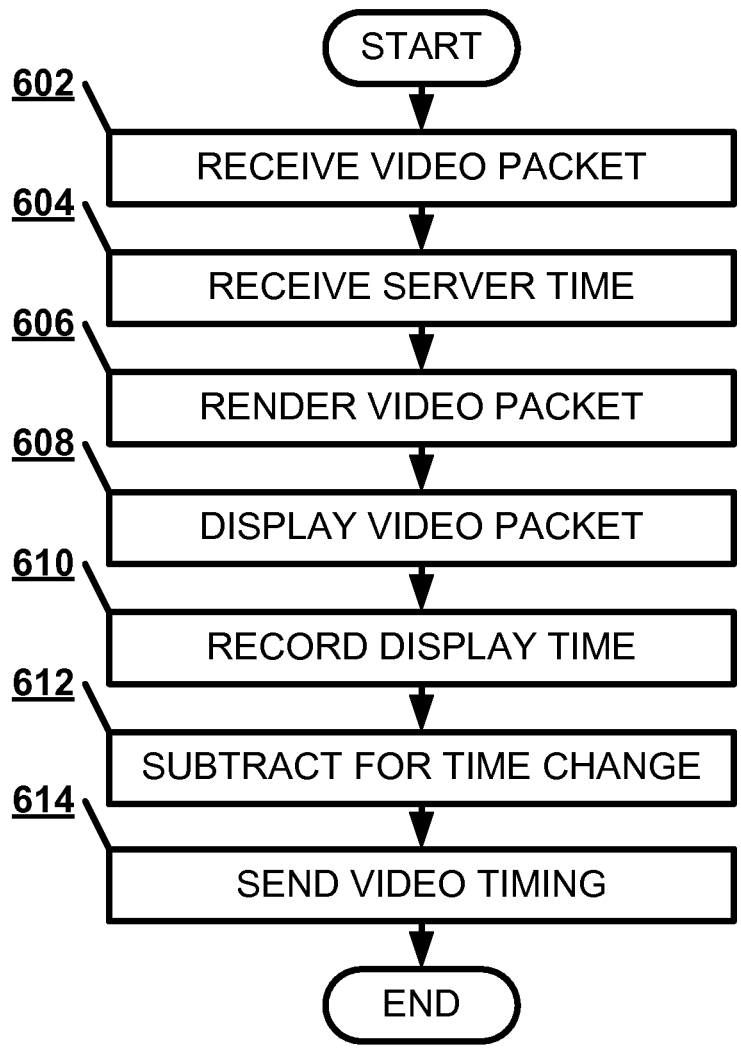
FIG. 6 illustrates, in a flowchart, one example of a method for processing a video stream in a video pipeline.

FIG. 6 illustrates, in a flowchart, one example of a method 600 for processing a video stream in a video pipeline. The video pipeline may receive a current video packet of a video stream from a streaming application server (Block 602). The video pipeline may receive a server video record time with the current video packet indicating when the current video packet was generated from the streaming application server (Block 604). The video pipeline may render the current video packet for presentation to the user (Block 606). The video pipeline may display the current video packet of the video stream to the user (Block 608). The video pipeline may record a client display time for the current video packet indicating when the current video packet was displayed to the user (Block 610). The video pipeline may subtract a server video record time from a client display time to determine a video display time change for a video stream describing a video delay between generating video data at the streaming application server and displaying the video data at a computing device, such as a streaming client device, to the user (Block 612). The video pipeline may send the video timing report, including the server video record time, the client display time, and the video display time change to a media synchronization module (Block 614).

Figure 7:
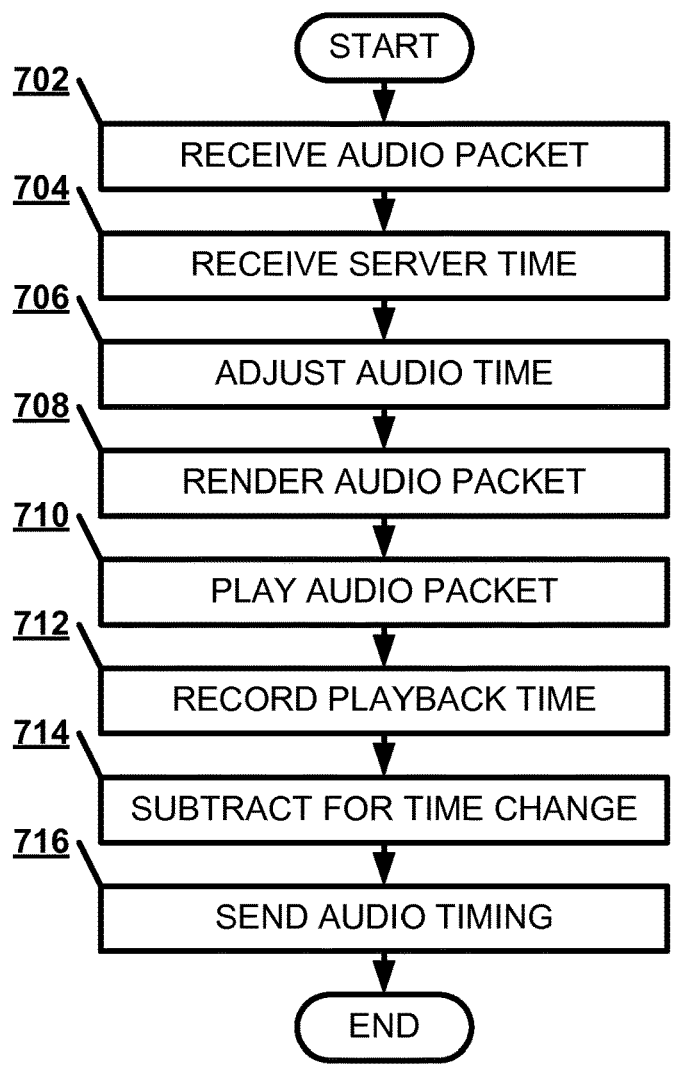
FIG. 7 illustrates, in a flowchart, one example of a method for processing an audio stream in an audio pipeline.

FIG. 7 illustrates, in a flowchart, one example of a method 700 for processing an audio stream in an audio pipeline. The audio pipeline may receive a current audio packet of an audio stream from a streaming application server (Block 702). The audio pipeline may receive a server audio record time with the current audio packet indicating when the current audio packet was generated at the streaming application server (Block 704). The audio pipeline may adjust an audio presentation time for the audio stream indicating when a subsequent audio packet is played to the user based on a synchronization metric provided by the media synchronization module that incorporates the video display time change (Block 706). The audio pipeline may render the current audio packet for presentation to the user (Block 708). The audio pipeline may render the current audio packet of the audio stream on a playback device to the user (Block 710). The audio pipeline may record a client playback time for the current audio packet indicating when the current audio packet was rendered on a playback device to the user (Block 712). The audio pipeline may subtract a server audio record time from a client display time to determine the audio playback time change for an audio stream describing an audio delay between generating audio data at the streaming application server and playing the audio data at a computing device, such as a streaming client device, to the user (Block 714). The audio pipeline may send the audio timing report, including the server audio record time, the client display time, and the audio playback time change to the media synchronization module (Block 716).

Figure 8:
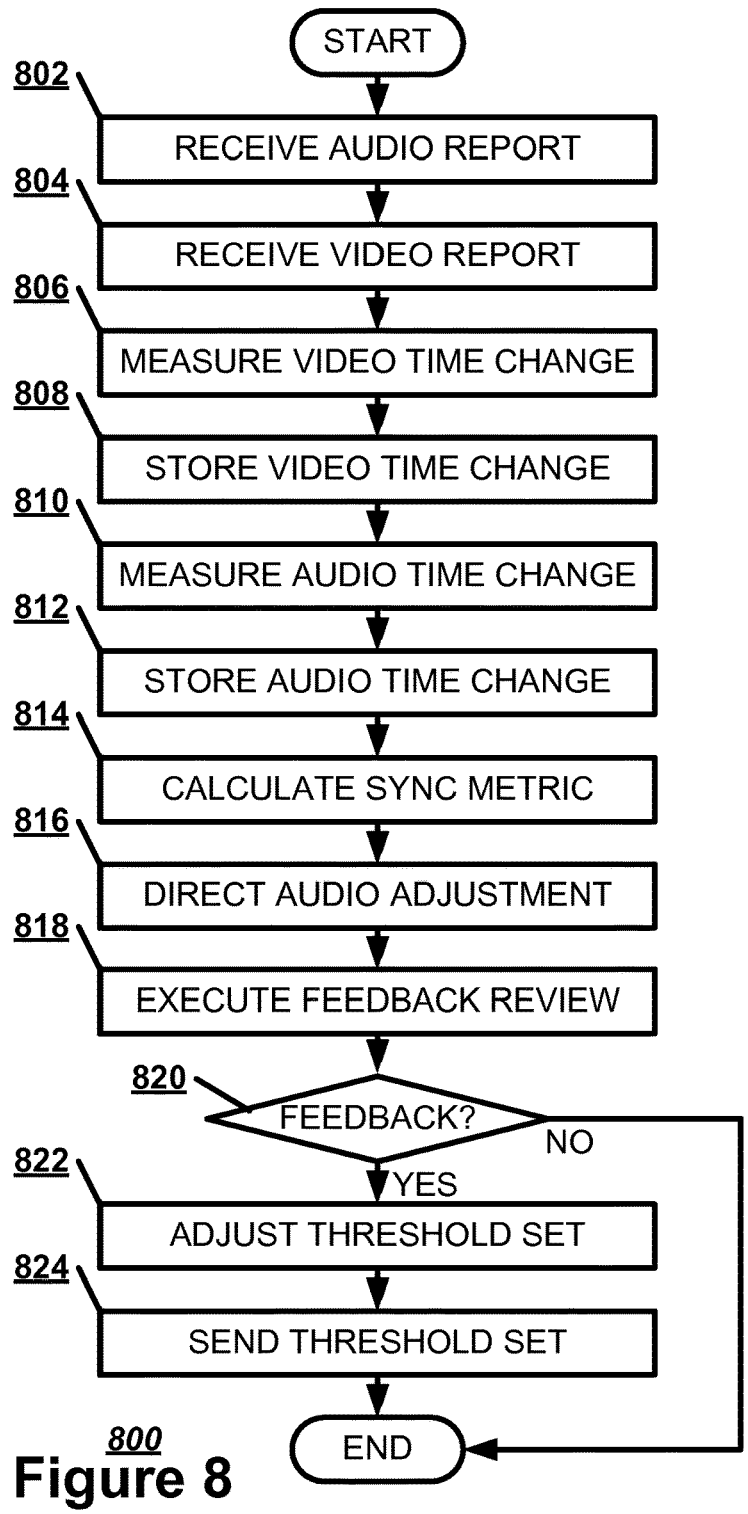
FIG. 8 illustrates, in a flowchart, one example of a method for synchronizing a video stream and an audio stream in a media synchronization module.

FIG. 8 illustrates, in a flowchart, one example of a method 800 for synchronizing a video stream and an audio stream in a media synchronization module. The media synchronization module may receive an audio timing report from the audio renderer (Block 802). The media synchronization module may receive a video timing report from the video renderer (Block 804). The media synchronization module may synchronize an audio stream to the video stream by measuring a video display time change for the video stream describing a video delay between generating video data at a streaming application server and displaying the video data at a computing device, such as a client streaming device, to a user (Block 806). The media synchronization module may store the video display time change in memory (Block 808). The media synchronization module may measure audio playback time change for the audio stream describing an audio delay between generating audio data at a streaming application server and displaying the audio data at the computing device, such as the client streaming device, to the user (Block 810). The media synchronization module may store the audio playback time change in memory (Block 812). The media synchronization module may calculate a synchronization metric describing a delay difference between the video stream and the audio stream based on a difference between the video display time change and an audio playback time change (Block 814). The media synchronization module may direct an audio adjustment module to adjust an audio presentation time for the audio stream based on a synchronization metric incorporating the video display time change (Block 816). The media synchronization module may execute a synchronization feedback review comparing the client display time for the current video packet with the client playback time for the current audio packet (Block 818). If synchronization feedback review indicates that the current video packet and the current audio packet is not synchronized, within a given tolerance (Block 820), the media synchronization module may adjust a metric threshold of a metric threshold set describing at least one adjustment benchmark, such as a compression threshold, a lengthening threshold, a drop threshold, or a delay threshold, based on a synchronization feedback review (Block 822). The media synchronization module may send the adjusted metric threshold set to the audio adjustment module (Block 824).

Figure 9:
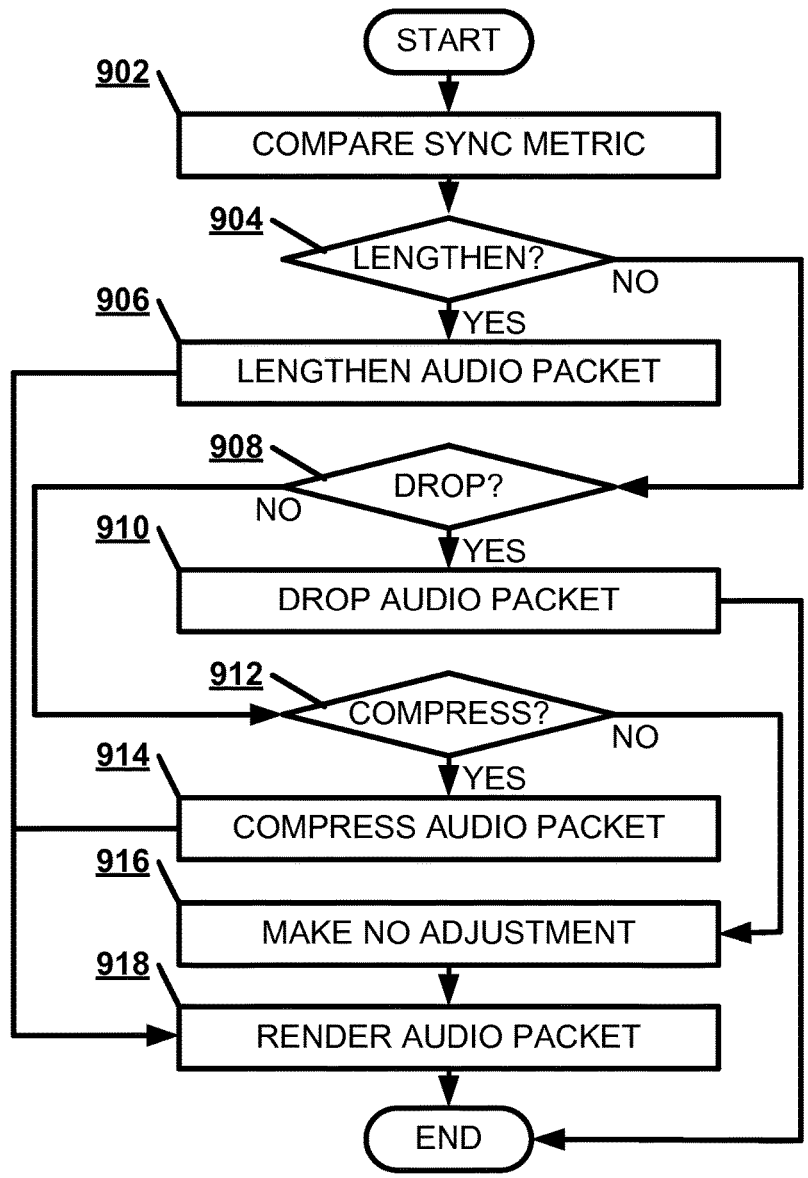
FIG. 9 illustrates, in a flowchart, one example of a method for using resampling to adjust an audio presentation time for an audio stream indicating when a subsequent audio packet is played to the user based on a synchronization metric.

FIG. 9 illustrates, in a flowchart, one example of a method 900 for using resampling to adjust an audio presentation time for an audio stream indicating when a subsequent audio packet is played to the user based on a synchronization metric. The audio adjustment module may compare a synchronization metric describing a delay difference between the video stream and the audio stream to a metric threshold set describing at least one adjustment benchmark (Block 902). If the synchronization metric is above a lengthening threshold (Block 904), the audio adjustment module may lengthen the current audio packet when a synchronization metric is above a lengthening threshold (Block 906). If the synchronization metric is below a drop threshold (Block 908), the audio adjustment module may drop the current audio packet when a synchronization metric is below a drop threshold (Block 910). If the synchronization metric is below a compression threshold (Block 912), the audio adjustment module may compress the current audio packet when a synchronization metric is below a compression threshold (Block 914). Otherwise, the audio adjustment module may make no adjustment to the audio stream (Block 916). The audio playback device may render the current audio packet for playback to the user (Block 918).

Figure 10:
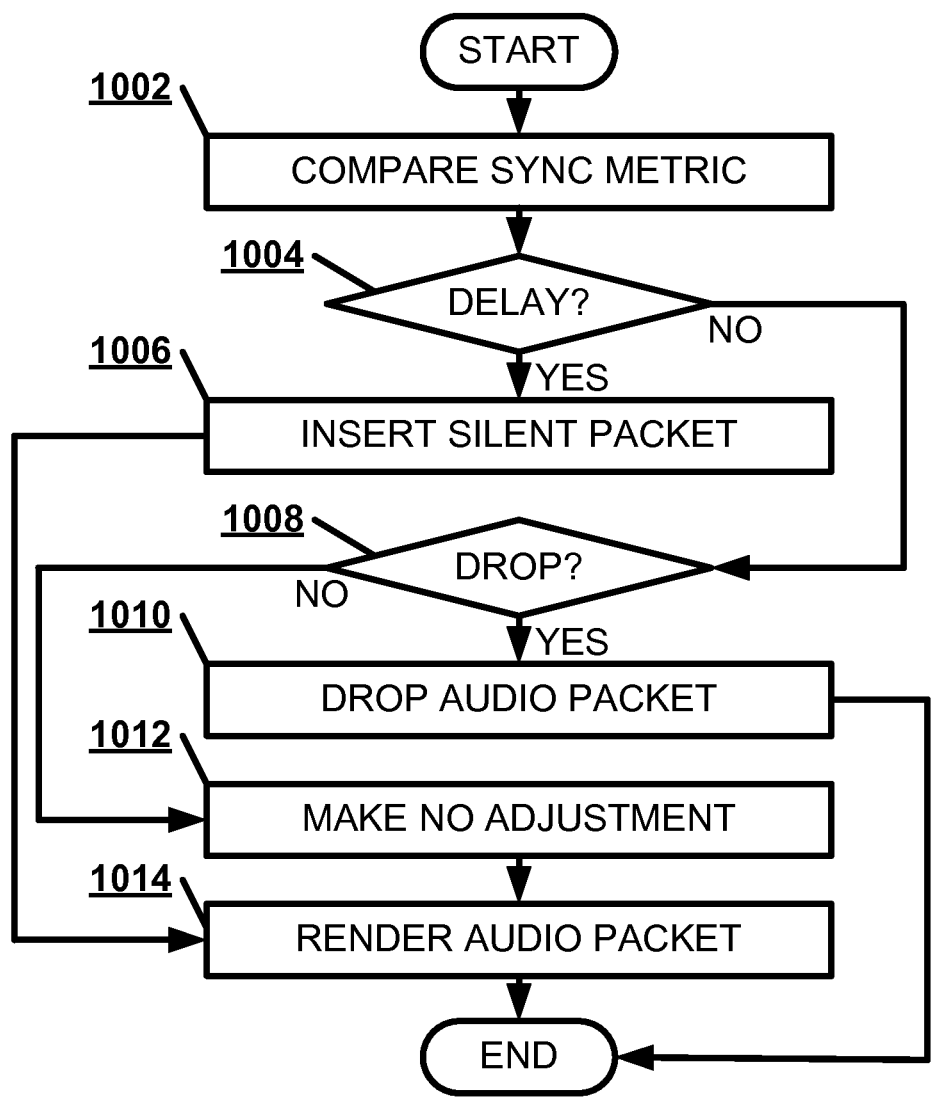
FIG. 10 illustrates, in a flowchart, one example of a method for using silence padding to adjust an audio presentation time for an audio stream indicating when a subsequent audio packet is played to the user based on a synchronization metric.

FIG. 10 illustrates, in a flowchart, one example of a method 1000 for using silence padding to adjust an audio presentation time for an audio stream indicating when a subsequent audio packet is played to the user based on a synchronization metric. The audio adjustment module may compare a synchronization metric describing a delay difference between the video stream and the audio stream to a metric threshold set describing at least one adjustment benchmark (Block 1002). If the synchronization metric is above a delay threshold (Block 1004), the audio adjustment module may insert a silent audio packet into the audio stream when a synchronization metric is above a delay threshold (Block 1006). If the synchronization metric is below a drop threshold (Block 1008), the audio adjustment module may drop the current audio packet when a synchronization metric is below a drop threshold (Block 1010). Otherwise, the audio adjustment module may make no adjustment to the audio stream (Block 1012). The audio playback device may render the current audio packet for playback to the user (Block 1014).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A streaming client device, comprising:
   a communication interface configured to have an audio channel to receive an audio stream of a streaming media content from a streaming application server and configured to have a video channel to receive a video stream of the streaming media content from the streaming application server,
   wherein the video stream and audio stream are separately transmitted concurrently by the streaming application server to the streaming client device; and
   a processing core having at least one processor configured to execute a media synchronization module to synchronize the audio stream to the video stream by measuring and storing a video display time change for each of a plurality of video packets of the video stream, wherein the video display time change is a representation of a total video delay between generating video data included in a current video packet of the plurality of video packets of the video stream at the streaming application server and displaying the video data at the streaming client device to a user,
   wherein the processing core is configured to execute an audio adjustment module to adjust an audio presentation time for the audio stream by adjusting when a subsequent audio packet of the audio stream is played to the user based on the stored video display time change to synchronize playback of the subsequent audio packet with a subsequent video packet of the video stream.

2. The streaming client device of claim 1, wherein the video channel is configured to receive a server video record time with the current video packet indicating when the current video packet was generated at the streaming application server.

3. The streaming client device of claim 2, further comprising a memory configured to record a client display time for the current video packet indicating when the current video packet was displayed to the user.

4. The streaming client device of claim 3, wherein the media synchronization module is further configured to subtract the received server video record time from the recorded client display time to determine the video display time change.

5. The streaming client device of claim 1, wherein the audio channel is configured to receive a server audio record time with the current audio packet indicating when the current audio packet was generated at the streaming application server.

6. The streaming client device of claim 1, further comprising:
   memory configured to record a client playback time for the current audio packet indicating when the current audio packet was played to the user.

7. The streaming client device of claim 1, wherein the media synchronization module is further configured to subtract a server audio record time from a client playback time to determine an audio playback time change describing an audio delay between generating audio data at the streaming application server and playing the audio data at the streaming client device to the user.

8. The streaming client device of claim 1, wherein the media synchronization module is further configured to calculate a synchronization metric describing a delay difference between the video stream and the audio stream based on a difference between the video display time change and an audio playback time change.

9. The streaming client device of claim 1, wherein the audio adjustment module is further configured to insert a silent audio packet into the audio stream when a synchronization metric is above a delay threshold.

10. The streaming client device of claim 1, wherein the audio adjustment module is further configured to lengthen the current audio packet when a synchronization metric is above a lengthening threshold.

11. The streaming client device of claim 1, wherein the audio adjustment module is further configured to compress the current audio packet when a synchronization metric is below a compression threshold.

12. The streaming client device of claim 1, wherein the audio adjustment module is further configured to drop the current audio packet when a synchronization metric is below a drop threshold.

13. The streaming client device of claim 1, wherein the media synchronization module is configured to adjust a metric threshold set describing at least one adjustment benchmark based on a synchronization feedback review.

14. A computing device, comprising:
    a memory to store a video display time change for a video stream wherein the video display time change is a representation of a total video delay between generating video data at a streaming application server and displaying the video data at the computing device to a user and an audio playback time change for an audio stream wherein the audio display time change is a representation of a total audio delay between generating audio data at the streaming application server and playing the audio data at the computing device to the user; and
    a processor configured to:
      receive in the computing device a plurality of video packets of the video stream of a streaming media content from the streaming application server;
      receive an audio stream of the streaming media content from the streaming application server, wherein the video stream and audio stream are separately transmitted concurrently by the streaming application server to the computing device;
      synchronize the audio stream to the video stream by measuring and storing the video display time change for each of the plurality of video packets of the video stream;
      calculate and store a synchronization metric that represents a delay difference between the video stream and the audio stream based on a difference between the video display time change and the audio playback time change; and adjust an audio presentation time for the audio stream by adjusting when a subsequent audio packet of the audio stream is played to the user based on the stored synchronization metric to synchronize playback of the subsequent audio packet with a subsequent video packet of the video stream.

15. The computing device of claim 14, wherein the processor is further configured to lengthen the current audio packet when a synchronization metric is above a lengthening threshold.

16. The computing device of claim 14, wherein the processor is further configured to drop the current audio packet when a synchronization metric is below a drop threshold.

17. The computing device of claim 14, wherein the processor is further configured to compress the current audio packet when a synchronization metric is below a compression threshold.

18. The computing device of claim 14, wherein the processor is further configured to insert a silent audio packet into the audio stream when a synchronization metric is above a delay threshold.

19. A machine-implemented method, comprising:

receiving, in a streaming client device, a plurality of video packets of a video stream of a streaming media content and a server video record time indicating when each video packet was generated from a streaming application server;

receiving, in the streaming client device, a current audio packet of an audio stream of the streaming media content from the streaming application server, wherein the video stream and audio stream are separately transmitted concurrently by the streaming application server to the streaming client device;

recording a client display time for a current video packet of the plurality of video packets indicating when the current video packet was displayed to a user;

subtracting the server video record time of the current video packet from the client display time for the current video packet to determine and store a video display time change for the video stream, wherein the video display time change is a representation of a total video delay between generating video data included in the current video packet of the plurality of video packets of the video stream at the streaming application server and displaying the video data at the streaming client device to the user; and adjusting an audio presentation time for the audio stream by adjusting when a subsequent audio packet of the audio stream is played to the user based on the stored video display time change to synchronize playback of the subsequent audio packet with a subsequent video packet of the video stream.

20. The method of claim 19, further comprising:

receiving a server audio record time with the current audio packet indicating when the current audio packet was generated from the streaming application server;

recording a client playback time for the current audio packet indicating when the current audio packet was played to the user; and subtracting the server audio record time from the client playback time to determine an audio playback time change for an audio stream describing an audio delay between generating audio data at the streaming application server and playing the audio data at the streaming client device to the user.

* * * * *